United States Patent [19]
Kohl

[11] Patent Number: 5,105,935
[45] Date of Patent: Apr. 21, 1992

[54] ACCUMULATION TYPE ROLLER CONVEYOR DRIVE ASSEMBLY

[75] Inventor: Robert E. Kohl, Duxbury, Mass.

[73] Assignee: Jervis B. Webb Company, Farmington Hills, Mich.

[21] Appl. No.: 703,418

[22] Filed: May 21, 1991

[51] Int. Cl.$^5$ .................................................. B65G 13/06
[52] U.S. Cl. ..................................... 198/781; 198/789; 198/790; 198/791
[58] Field of Search ................. 198/781, 789, 790, 791

[56] References Cited

U.S. PATENT DOCUMENTS

| | | | |
|---|---|---|---|
| 4,108,303 | 8/1978 | Vogt et al. | 198/781 |
| 4,344,527 | 8/1982 | Vogt et al. | 198/781 |
| 4,473,149 | 9/1984 | Vogt et al. | 198/781 |
| 4,488,639 | 12/1984 | Vogt et al. | 198/781 X |
| 4,572,358 | 2/1986 | Swain | 198/781 |
| 4,993,541 | 2/1991 | Roh | 198/781 |

Primary Examiner—Joseph E. Valenza
Assistant Examiner—Cheryl L. Gastineau
Attorney, Agent, or Firm—Joseph W. Farley

[57] ABSTRACT

An accumulation type roller conveyor drive assembly comprising a sprocket and drive wheel unit rotatably supported on a tubular cylindrical bushing mounted in a housing formed by separate upper and lower portions. These housing portions have sides formed with abutting surfaces lying in a common plane passing through the axis of the bushing, with semicircular recesses engageable with peripheral end portions of the bushing, and with interfitting tabs and recesses for positioning the housing portions in assembled relation. An axle bolt, insertable through openings formed by semicircular apertures in the sides of the housing portions concentric with their respective recesses, and through a central passage in the bushing, receives a nut which when tightened, clamps the sides of the housing portions between the axle bolt head and nut and the bushing ends, thereby locking the drive assembly components in assembled condition.

9 Claims, 6 Drawing Sheets

ACCUMULATION TYPE ROLLER CONVEYOR DRIVE ASSEMBLY

SUMMARY OF THE INVENTION

This invention relates to an accumulation type roller conveyor having axially parallel load carrying rollers mounted between a pair of side frames and having a plurality of drive assemblies each having a chain-driven sprocket and drive wheel unit movable into and out of frictional engagement between the drive wheel and the peripheries of an adjacent pair of the load carrying rollers. In particular, the invention relates to improvements in this drive assembly, which improvements simplify the construction and enable the sprocket and drive wheel unit to be readily removed and replaced, as required.

Related accumulation type roller conveyors are disclosed in the Vogt et al. U.S. Pat. Nos. 4,108,303, 4,344,527 and 4,473,149; and also in the Swain U.S. Pat. No. 4,572,358. The Vogt et al. patents teach a drive assembly having a housing with a detachable bottom panel which permits disengagement of the chain from the drive wheel sprocket for removal and replacement of the drive assembly. The Swain patent discloses a drive assembly in which a sprocket and drive wheel unit is mounted in a split housing having upper and lower parts provided with side flanges connected together by a plurality of bolts, thereby permitting separation of the housing parts for removal of the sprocket and drive wheel unit.

The drive assembly of the present invention includes a sprocket and a drive wheel coaxially mounted as a unit on a hub having a bore. A tubular cylindrical bushing having opposite ends axially spaced apart a distance greater than the axial length of the hub is rotatably engaged by the bore therein, and has an internal cylindrical passage extending between the opposite bushing ends. The bushing is supported by a housing having separate lower and upper portions. The lower housing portion is formed by integral opposite lower side walls, a bottom wall, and lower end walls extending between the lower side walls above the bottom wall, the lower side walls and one of the lower end walls being provided with upwardly facing surfaces lying in a common plane extending through the axis of the bushing. Oppositely facing lower semicircular recesses on inner faces of the lower side walls extend from the upwardly facing surfaces and are adapted to be engaged by lower semicircular peripheral portions of the bushing at the opposite ends thereof. The upper housing portion is formed by integral opposite upper side walls, upper end walls and a top wall connecting the upper side walls above and intermediate the upper end walls, the upper side walls and one of the upper end walls being provided with downwardly facing surfaces which lies in a common plane and which are adapted to abuttingly engage the upwardly facing lower side wall and one end wall surfaces of the lower housing portion. Oppositely facing upper semicircular recesses on the inner faces of the upper side walls extend from the downwardly facing surfaces and are adapted to be engaged by upper semicircular peripheral portions of the bushing at the opposite ends thereof. Interfitting tabs and recesses formed on the lower and upper portions are provided to position the housing portions in assembled relation with their respective upwardly and downwardly facing surfaces in abutment and with their respective lower and upper semicircular recesses engaging the peripheral end portions of the bushing. An axle bolt, extending through circular openings formed by semicircular apertures in the lower and upper side walls concentric with the lower and upper semicircular recesses therein, and extending through the internal cylindrical passage of the bushing, has a head and a nut drawable into engagement with oppositely facing outer side wall surfaces surrounding the apertures, and thereby retains the lower and upper housing portions in assembled relation clamped between the opposite ends of the bushing and the head and nut of the axle bolt.

The drive assembly of the invention can be put together by placing the sprocket and drive wheel hub on the bushing, positioning opposite peripheral end portions of the bushing in the lower semicircular recesses of the lower housing portion, engaging the interfitting tabs and recesses of the upper and lower housing portions to thereby position the upper housing portion on the lower housing portion with the upper semicircular recesses engaging opposite peripheral end portions of the bushing, inserting the axle bolt through the housing apertures and the internal passage of the housing, and tightening the axle bolt nut. Alternatively, the axle bolt and nut can be preassembled loosely with the sprocket and drive wheel unit and bushing and tightened after this preassembly has been mounted in the lower and upper housing portions.

A simple loosening of the axle bolt nut of a drive assembly of the invention in use on an accumulation type roller conveyor permits the upper housing portion to be separated from the lower housing portion and the drive wheel and sprocket unit to be removed and replaced, as may be required, for example due to wear on the drive wheel.

Other features and advantages of the invention will appear from the description to follow of the embodiment thereof disclosed in the accompanying drawings.

DETAILED DESCRIPTION

Figure 1:
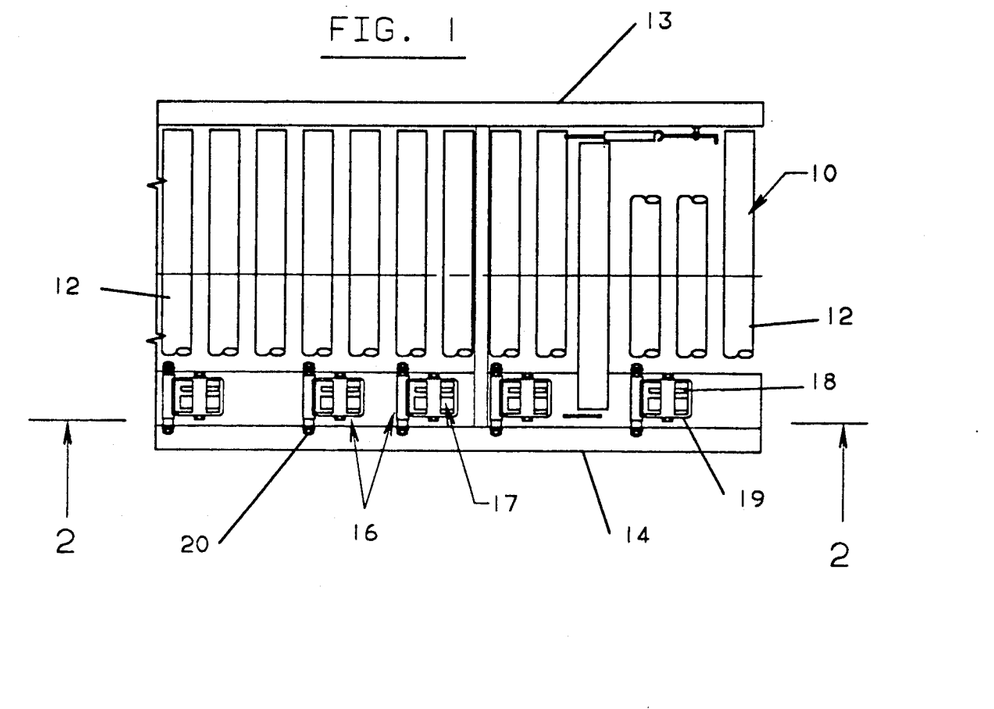
FIG. 1 is a schematic plan view of a portion of an accumulation type roller conveyor.
Figure 2:
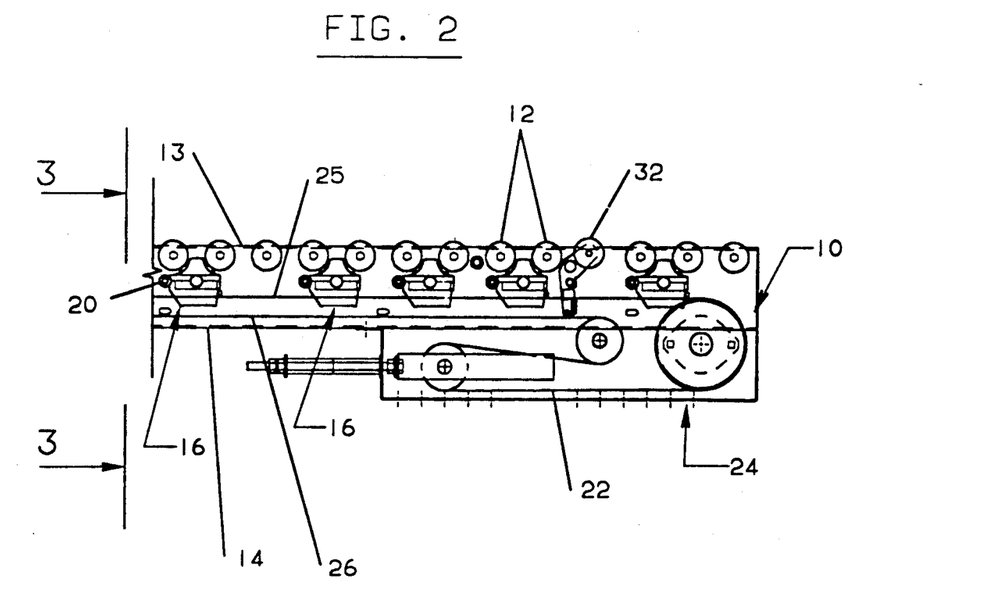
FIG. 2 is a side elevation taken as indicated by the line 2—2 of FIG. 1.
Figure 3:
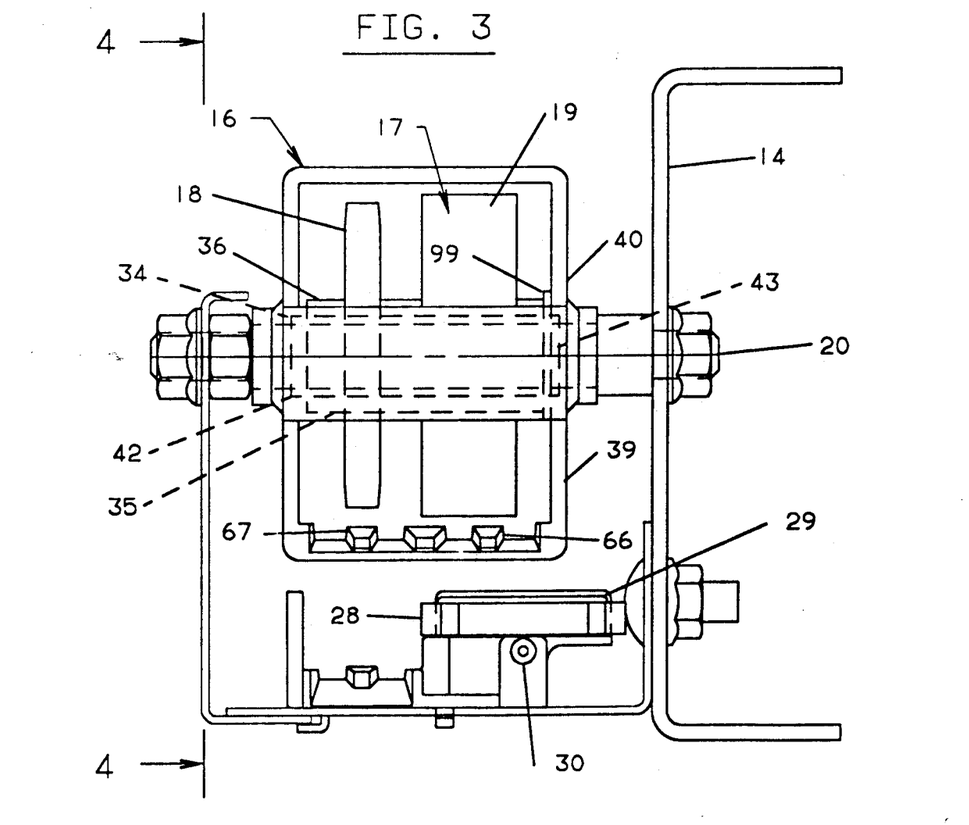
FIG. 3 is an enlarged sectional view, taken as indicated by the line 3—3 of FIG. 2 showing a drive assembly of the invention and an actuator.
Figure 4:
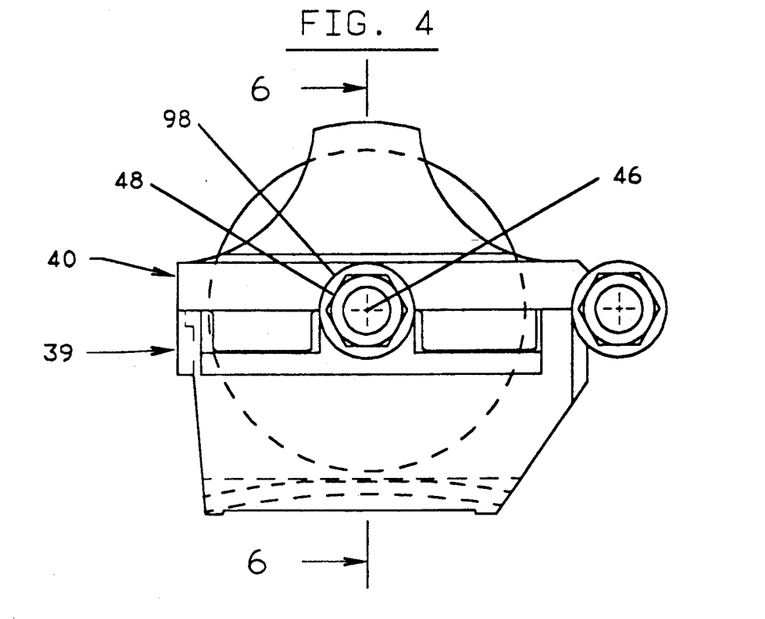
FIG. 4 is a side elevation of the drive assembly, taken in the direction of the arrows 4—4 of FIG. 3.

FIGS. 1 and 2 schematically illustrate an end portion of an accumulation type roller conveyor 10. A plurality of axially parallel load carrying rollers 12 are mounted between side frames 13 and 14. Drive assemblies 16, each rotatably carrying a sprocket and coaxial drive wheel unit 17, are supported on the side frame 14 by pivots 20 for movement on axes extending substantially parallel to the axes of the load carrying rollers 12. An endless chain 22 is driven by a drive unit 24 and has a driving run 25 and a return run 26 extending along the side frame 14. The sprocket 18 of each unit 17 engages the chain driving run 25; the drive wheel 19 of each unit 17 is frictionally engageable with the peripheries of an adjacent pair of the load carrying rollers 12, as indicated in FIG. 2, such engagement resulting from the pivotal movement of the drive assemblies 16 by an actuator 28 associated with each drive assembly as shown in FIG. 3. Each actuator 28 has a diaphragm 29 which is expandable into engagement with its associated drive assembly 16 by a connection 30 to a fluid pressure source through a control valve operated by a load sensing roller 32 in the known manner, there being a sensing roller, control valve and related fluid pressure connections for each group of load carrying rollers and their drive assemblies.

Figure 5:
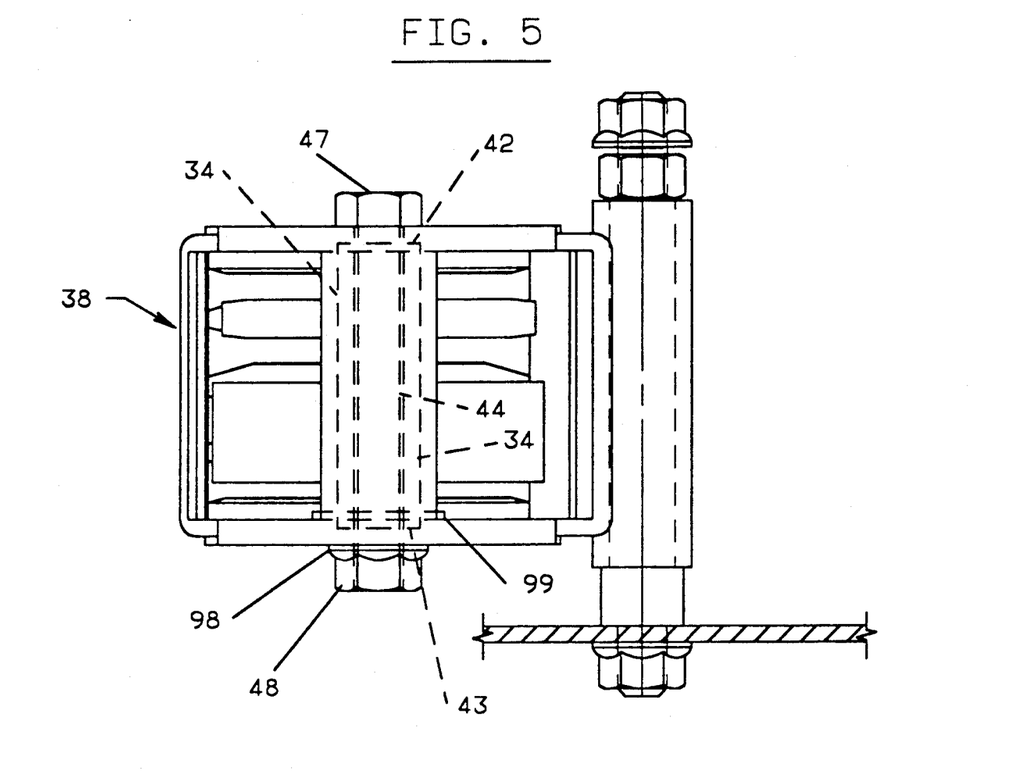
FIG. 5 is a plan view of the drive assembly of FIG. 4.
Figure 6:
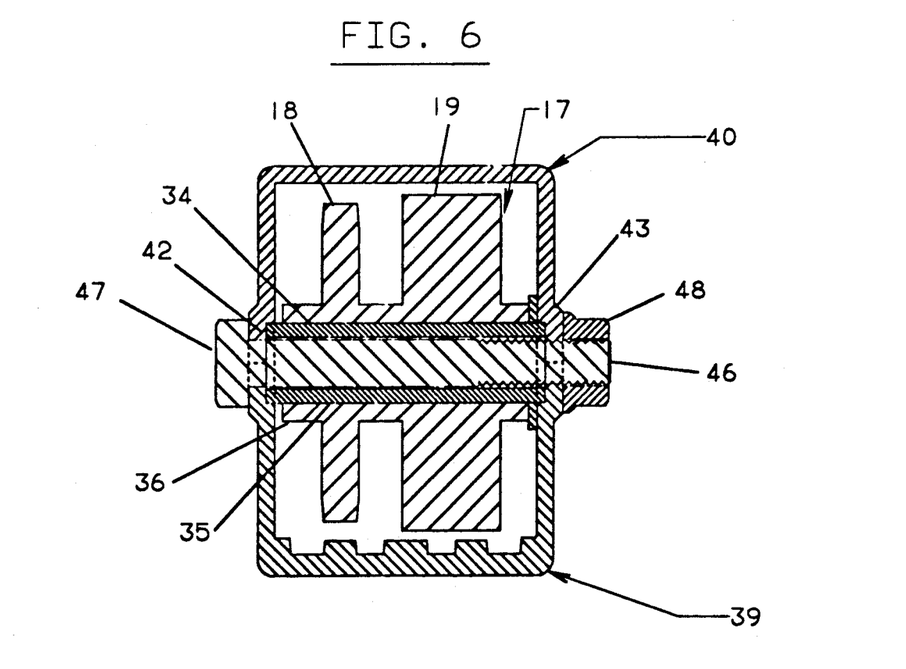
FIG. 6 is a sectional elevation on the line 6—6 of FIG. 4.

The drive assembly 16, as shown in FIGS. 3-6, comprises a tubular cylindrical bushing 34 which is rotatably engaged by a bore 35 of a hub 36 forming part of the sprocket and coaxial drive wheel unit 17, and which is supported by a housing 38 having a lower portion 39 and a separate upper portion 40. The bushing 34 has opposite ends 42 and 43 axially spaced apart a distance greater than the axial length of the hub 36 and has an internal cylindrical passage 44 extending between the opposite ends 42 and 43. In general, the lower and upper housing portions are constructed (as described in detail below) so as to be interfittingly assembled together, to engage peripheral portions of the bushing 34 adjacent to the opposite ends 42 and 43 thereof, and to be retained in assembled relation by an axle bolt 46 which is insertable through the internal passage 44 of the bushing 34 and which has a head 47 and a nut 48 drawable into engagement with opposite outer surfaces of the upper and lower housing portions 39 and 40 to clamp the housing portions against the opposite ends 42 and 43 of the bushing 34, as best shown in FIG. 6.

Figure 10:
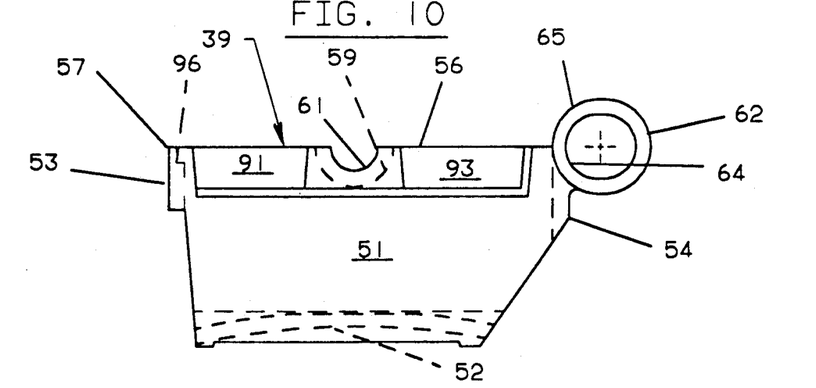
FIG. 10 is a side elevation of the lower portion of the drive assembly housing.
Figure 11:
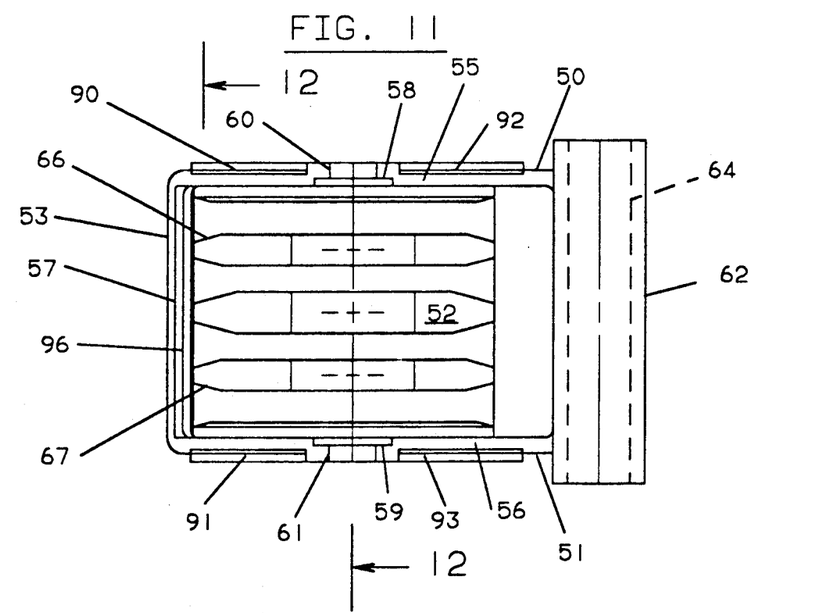
FIG. 11 is a plan view of the lower portion of the drive assembly housing.
Figure 12:
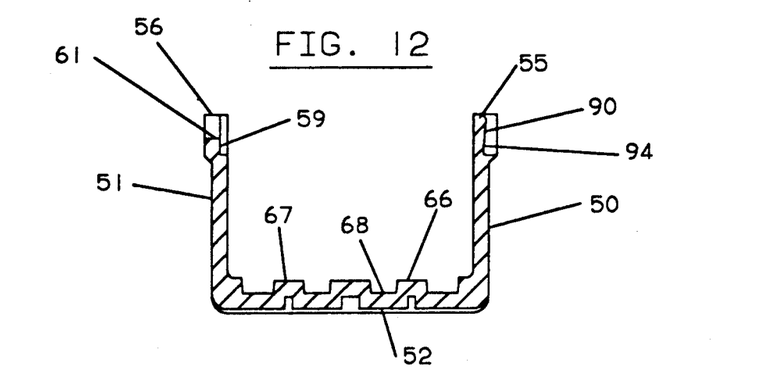
FIG. 12 is a sectional elevation taken as indicated by the line 12—12 of FIG. 11.

Details of the lower housing portion 39 appear in FIGS. 10-12. This housing portion 39 is formed by integral opposite lower side walls 50 and 51, a bottom wall 52, and lower end walls 53 and 54 extending between the lower side walls 50 and 51 above the bottom wall 52. Upwardly facing surfaces 55 and 56 of the lower side walls and an upwardly facing surface 57 of one of the lower end walls 53 lie in a common plane which extends substantially through the axis of the bushing 34 of the drive assembly. Formed on that axis and on the inner faces of the lower side walls 50 and 51 are oppositely facing lower semicircular recesses 58 and 59 adapted to be engaged by lower semicircular peripheral portions of the bushing 34 at the opposite ends 42 and 43 thereof. Semicircular apertures 60 and 61 are formed in the lower side walls 50 and 51 concentric with their respective semicircular recesses 58 and 59.

An integrally formed boss 62 (FIGS. 10 and 11) extends outwardly from the other lower end wall 54, projects beyond the lower side walls 50 and 51, and has an ovaloid bore 64 whose major dimension lies substantially in the common plane of the upwardly facing lower side and end wall surfaces 55-57. An outer arcuate peripheral surface 65 (FIG. 10) of the boss 62 extends from the inner face of the other lower end wall 54 upwardly and outwardly of the upwardly facing surfaces 55 and 56 of the lower side walls 50 and 51. A left hand chain guide 66 and a right hand chain guide 67 are provided on the inner surface 68 of the bottom wall 52.

Figure 7:
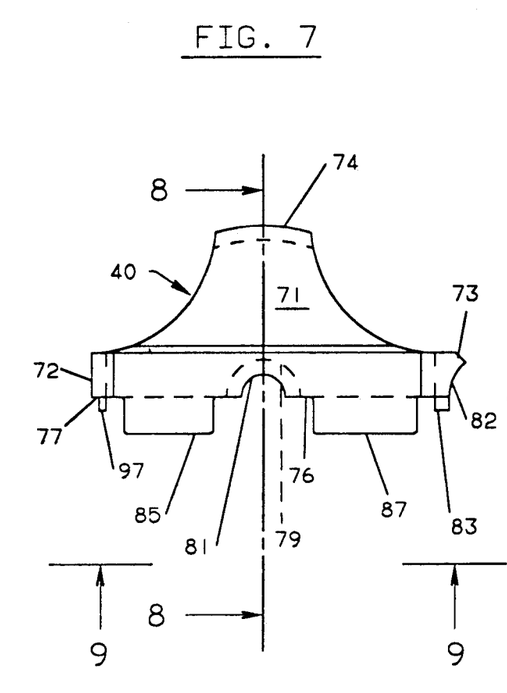
FIG. 7 is a side elevation of the upper portion of the drive assembly housing.
Figure 8:
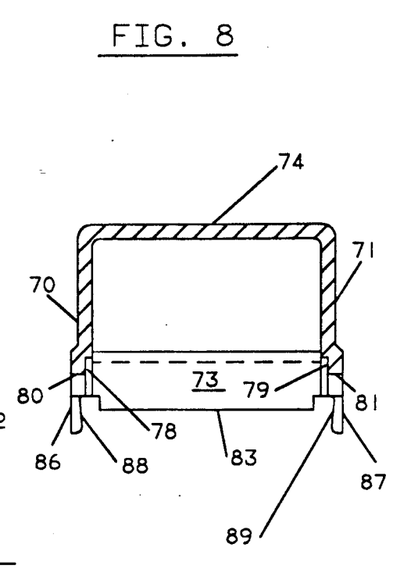
FIG. 8 is a sectional elevation taken on the line 8—8 of FIG. 7.
Figure 9:
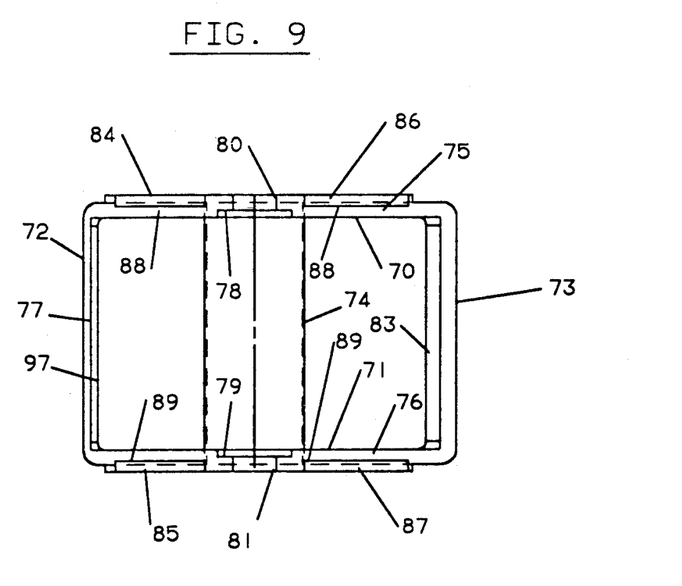
FIG. 9 is a plan view taken in the direction of the arrows 9—9 of FIG. 7.

The upper housing portion, shown in detail in FIGS. 7-9, is formed by integral opposite upper side walls 70 and 71, upper end walls 72 and 73, and a top web 74 connecting the upper side walls above and intermediate the upper end walls. The upper side walls 70 and 71 and one upper end wall 72 are provided with downwardly facing surfaces 75, 76 and 77 which lie in a common plane and are adapted to abuttingly engage the upwardly facing lower side wall surfaces 55 and 56 and the one lower end wall surface 57. Oppositely facing upper semicircular recesses 78 and 79 and semicircular apertures 80 and 81 concentric therewith extend upwardly from the surfaces 75 and 76, the recesses 78 and 79 being engageable by upper semicircular peripheral portions at the opposite ends 42 and 43 of the bushing 34.

As shown in FIG. 7, the other upper housing end wall 73 has an outer arcuate surface 82 complimentary with the arcuate surface 65 on the boss 62 of the lower housing portion 39. A projection 83 extends downwardly from the other upper end wall 73 and is positionable between the lower housing side walls 50 and 51.

A first pair of tab panels 84 and 85 and a second pair of tab panels 86 and 87 are formed on the upper housing side walls 70 and 71 outwardly of the downwardly facing surfaces 75 and 76, the first pair of tab panels 84 and 85 being spaced from the one upper end wall 72 and from the upper semicircular recesses 78 and 79. The second pair of tab panels 86 and 87 is spaced from the upper semicircular recesses 78 and 79 and from the other end wall 73. As shown in FIGS. 7 and 9, the length of the second tab panels 86 and 87 is greater than that of the first tab panels 84 and 85. The tab panels of each pair have opposed, converging inner faces 88 and 89, as shown in FIG. 8.

Referring to FIGS. 10-12, first and second pairs of recesses 90, 91 and 92, 93 are formed on the lower housing side walls 50 and 51 outwardly of the upwardly facing surfaces 55 and 56 and extending downwardly therefrom. These first and second pairs of recesses are overlappingly engageable by the first and second pairs of tab panels, respectively, and have oppositely diverging surfaces, shown by the surface 94 in FIG. 12, interfittingly engageable by the opposed converging inner faces 88 and 89 of the first and second pairs of tab panels. A ledge 96 on the lower end wall 53 is located inwardly of and projects downwardly from the upwardly facing end wall surface 57, extends transversely between the lower side walls 50 and 51, and is engageable by a lip 97 (FIGS. 7 and 9) provided on the upper housing end wall 72 inwardly of and projecting downwardly from the surface 77.

Figure 13:
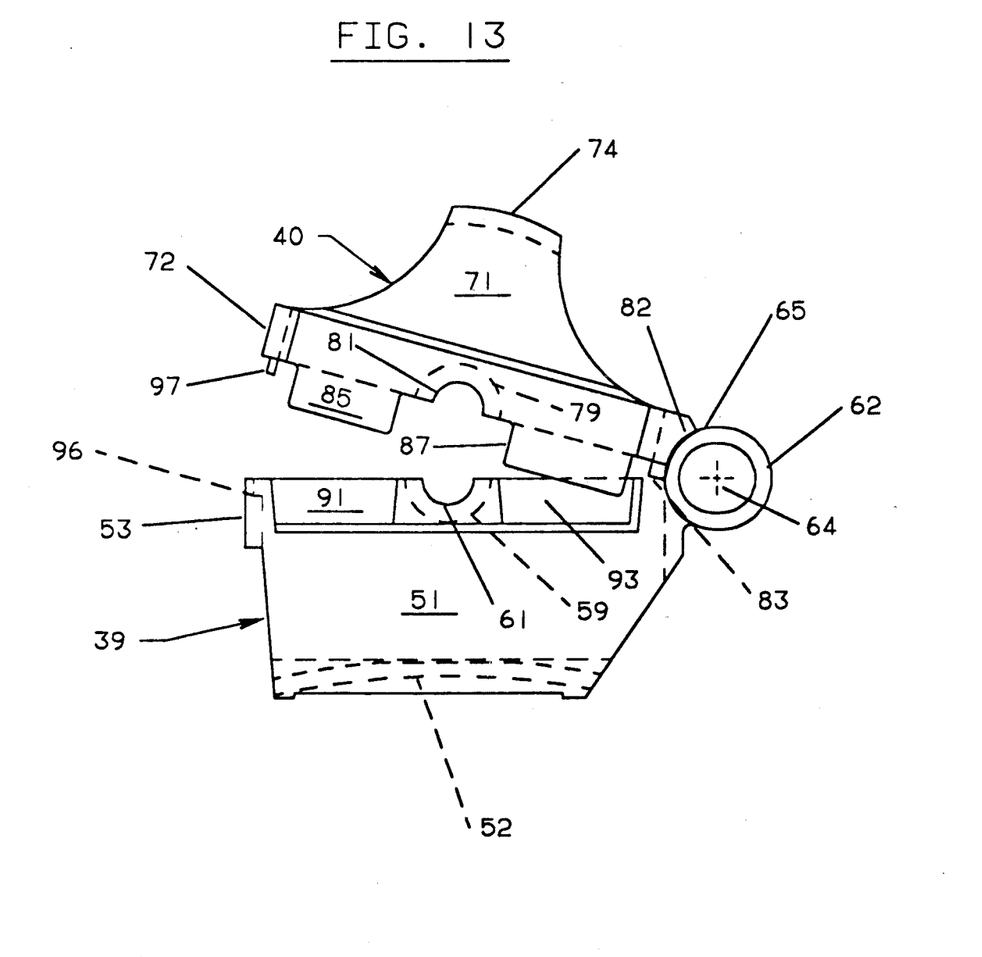
FIG. 13 is a side elevation showing the upper and lower portions of the housing in a partially separated condition.

Interfitting engagement of the lower and upper portions 39 and 40 of the housing 38 is illustrated by FIG. 13. One way of establishing this engagement is to position the arcuate end surface 82 of the upper housing portion 40 against the arcuate outer surface 65 of the lower housing portion boss 62 and then rock the upper housing portion 40 on the surface 65 thereby placing the projection 83 on the upper end wall 73 between the lower side walls 50 and 51, interlocking the second and first pairs of tab panels 86, 87 and 84, 85 with the second and first pairs of recesses 92, 93 and 90, 91, and placing the lip 97 on the upper end wall 72 into the ledge 96 on the lower end wall 53. This mode of assembly can be carried out with the hub 36 of the sprocket and drive wheel 17 unit and a thrust washer 99 (FIG. 3) placed on the bushing 34 and with the bushing ends 42 and 43 inserted into the semicircular recesses 58 and 59 of the lower side walls 50 and 51. The axle bolt 46 may also be put through the bushing, the lower semicircular apertures 58, 59, and the nut 48 fitted loosely on the bolt, before the upper housing 40 is interfitted with the lower housing 39, as described above. Then it is only necessary to tighten the nut 48 in order to lock the components in the assembled relation shown in FIGS. 3-6.

The locking action may be augmented by molding the lower and upper housing portions from a material such as Delrin 100, which is somewhat resilient and deformable, and by employing on the axle bolt 46 a nut 48 having a flange 98 with a serrated face. Tightening of this nut will not only force the inner faces of the upper and lower housing recesses into deformed abutment with the ends 42 and 43 of the bushing 34, but will also result in a deformed interlock of the serrated face of the nut flange 98 with the portions of the outer faces of the upper and lower side walls engaged thereby.

A drive assembly 16, when mounted on a conveyor side frame 14, as shown by FIGS. 3 and 5, floats on its pivot bolt 20 extending through the ovaloid bore 64 in the lower housing boss 62, thus providing uniform frictional engagement between the drive wheel 19 and the peripheries of an adjacent pair of load carrying rollers 12. Should replacement of the sprocket and drive wheel unit 17 become necessary, the removal of one load carrying roller will provide ready access to the axle bolt head 47 and the nut 48, as is apparent from FIG. 5. Simply loosening the nut permits the separation of the upper housing 40 from the lower housing 39 and the removal and replacement of the sprocket and drive wheel unit 17.

Accumulation type conveyors are frequently made with the driving components installed on the left hand side frame, rather than the right hand side frame 14 as shown in FIGS. 1-3. The right hand drive assembly of FIG. 3 can readily be converted to a left hand drive assembly simply by an end-to-end reversal of sprocket and drive wheel unit 17 before mounting the bushing 34 the lower and upper housing portions 39 and 40. The drive assembly 16 is attached to the left hand side frame by passing the pivot bolt 20 through the bore 64 in the opposite direction from that shown in FIG. 3 and by employing the left chain guide 66 for positioning the driving run 25 of the chain relative to the drive assembly sprocket 18.

We claim:

1. In an accumulation type roller conveyor having a pair of side frames, a plurality of axially parallel load carrying rollers mounted between said side frames, a plurality of drive assemblies, pivot means supporting said drive assemblies on one of said side frames for pivotal movement on axes extending substantially parallel to the axes of said load carrying rollers, an endless driven chain having driving and return runs extending along said one side frame, each of said drive assemblies including a sprocket and coaxial drive wheel unit rotatably carried thereby, said sprocket engaging said chain driving run and said drive wheel being frictionally engageable with the peripheries of an adjacent pair of said load carrying rollers, and actuating means for selectively pivotally moving said drive assemblies relative to said load carrying rollers for engagement and disengagement of the drive wheels therewith; the improvement wherein said drive assembly comprises:

a tubular cylindrical bushing for rotatably engaging a bore of a hub forming part of said sprocket and coaxial drive wheel unit, said bushing having opposite ends axially spaced apart a distance greater than the axial length of said hub and an internal cylindrical passage extending between said opposite ends;

a housing supporting said bushing, said housing having separate lower and upper housing portions;

said lower housing portion being formed by integral opposite lower side walls, lower end walls, and a bottom wall, said lower end walls extending between said lower side walls above said bottom wall, said lower side walls and one of said lower end walls being provided with upwardly facing surfaces lying in a common plane extending substantially through the axis of said bushing, and said lower side walls having inner, oppositely facing lower semicircular recesses extending from said upwardly facing surfaces and adapted to be engaged by lower semicircular, peripheral portions of said bushing at the said opposite ends thereof;

said upper housing portion being formed by integral opposite upper side walls, upper end walls and a top web connecting said upper side walls above and intermediate said upper end walls, said upper side walls and one of said upper end walls being provided with downwardly facing surfaces which lie in a common plane and which are adapted to abuttingly engage the said upwardly facing lower side wall and one lower end wall surfaces of said lower housing portion, said upper side walls having inner oppositely facing upper semicircular recesses extending upwardly from said downwardly facing surfaces and adapted to be engaged by upper semicircular peripheral portions of said bushing at the said opposite ends thereof;

interfitting tab and recess means formed on said lower and upper housing portions for detachably positioning said housing portions in assembled relationship with their respective upwardly and downwardly facing surfaces in abutment and with their respective lower and upper semicircular recesses engaging external peripheral portions of said bushing at said opposite ends thereof; and an axle bolt engageable with said internal cylindrical passage of said bushing, said axle bolt extending through circular openings formed by semicircular apertures in the lower and upper side walls of said lower and upper housing portions concentric with the said lower and upper semicircular recesses therein, said axle bolt having a head and a nut drawable into clamping engagement with oppositely facing outer said wall surfaces of said upper and lower housing portions surrounding said apertures for retaining said housing portions in assembled relation abutting the opposite ends of said bushing.

2. An accumulation type roller conveyor according to claim 1 wherein said pivot means for supporting said drive assembly includes a boss integrally formed on said lower housing portion and extending outwardly from the other lower end wall thereof, an ovaloid bore in said boss, said ovaloid bore having a major dimension lying substantially in said common plane of said upwardly facing surfaces of said lower side walls and one lower end wall of said lower housing portion.

3. An accumulation type roller conveyor according to claim 2 wherein said boss has an outer arcuate peripheral surface extending from the inner face of said other lower end wall upwardly and outwardly of said upwardly facing surfaces of said lower side walls, and said upper housing portion has at the other upper end wall thereof opposite to said one upper end wall an outer arcuate surface adapted to engage said arcuate peripheral surface of said boss.

4. An accumulation type roller conveyor according to claim 3 wherein said other upper end wall has a projection extending downwardly therefrom and adapted to be positioned between the opposite lower side walls of said lower housing portion.

5. An accumulation type conveyor according to claim 1 wherein said lower housing portion bottom wall is provided on the inner surface thereof with left and right hand chain guides, said chain guides being optionally engageable by said driving run of said driven chain and permitting end-for-end reversal of said sprocket and coaxial drive wheel unit on said bushing.

6. An accumulation type roller conveyor according to claim 1 wherein said interfitting tab and recess means comprises first and second pairs of tab panels formed on said upper housing portion side walls outwardly of said downwardly facing upper side wall surfaces and projecting downwardly therefrom, said first pair of tab panels being spaced from said one upper end wall and from said upper semicircular recesses, said second pair of tab panels being spaced from said upper semicircular recesses and from the opposite upper end wall; and first and second pairs of recesses formed on said lower housing portion side walls outwardly of said upwardly facing lower side wall surfaces and extending downwardly therefrom, said first and second pairs of recesses being overlappingly engageable by said first and second pairs of tab panels, respectively.

7. An accumulation type roller conveyor according to claim 6 wherein said first pair of tab panels and first pair of recesses have a dimension which differs from a corresponding dimension of said second pair of tab panels and second pair of recesses.

8. An accumulation type roller conveyor according to claim 7 wherein said first and second pairs of tab panels have opposed converging inner faces, and said first and second pairs of recesses have oppositely facing diverging outer faces engageable by said converging inner faces.

9. An accumulation type roller conveyor according to claim 8 wherein said upper housing portion is provided on said one upper end wall with a lip located inwardly of and projecting downwardly from the downwardly facing surface of said one upper end wall; and said lower housing portion is provided on said one lower end wall with a ledge located inwardly of and projecting downwardly from said upwardly facing surface of said one lower end wall, said ledge being engageable by said lip.

* * * * *